United States Patent
Hontz et al.

(10) Patent No.: US 8,851,565 B2
(45) Date of Patent: Oct. 7, 2014

(54) SEATBACK HOLDER FOR TABLET COMPUTERS

(75) Inventors: Jeffrey W. Hontz, Winston-Salem, NC (US); Alexander Nicholas Pozzi, Winston-Salem, NC (US); Glenn A. Johnson, Rural Hall, NC (US)

(73) Assignee: B/E Aerospace, Inc., Wellington, FL (US)

( * ) Notice: Subject to any disclaimer, the term of this patent is extended or adjusted under 35 U.S.C. 154(b) by 120 days.

(21) Appl. No.: 13/439,089

(22) Filed: Apr. 4, 2012

(65) Prior Publication Data

US 2012/0248833 A1    Oct. 4, 2012

Related U.S. Application Data

(60) Provisional application No. 61/471,487, filed on Apr. 4, 2011.

(51) Int. Cl.
*A47C 7/62*    (2006.01)
*A45C 11/00*   (2006.01)
*B64D 11/06*   (2006.01)
*B60N 3/00*    (2006.01)

(52) U.S. Cl.
CPC .............. *B64D 11/06* (2013.01); *A45C 11/00* (2013.01); *A45C 2011/003* (2013.01); *B60N 3/004* (2013.01); *B64D 2011/0679* (2013.01)
USPC ................................. 297/188.06; 297/188.04

(58) Field of Classification Search
USPC ........................................ 297/188.04, 188.06
See application file for complete search history.

(56) References Cited

U.S. PATENT DOCUMENTS

| | | | |
|---|---|---|---|
| 3,795,422 A * | 3/1974 | Robinson et al. | 297/146 |
| 4,167,287 A * | 9/1979 | Franklin et al. | 296/97.6 |
| 6,059,358 A * | 5/2000 | Demick et al. | 297/188.04 |
| 6,880,793 B2 * | 4/2005 | Huang et al. | 248/304 |
| 8,141,948 B2 * | 3/2012 | Cassellia et al. | 297/217.3 |
| 8,282,060 B2 * | 10/2012 | Fan | 248/291.1 |
| 8,424,825 B2 * | 4/2013 | Somuah | 248/316.4 |

* cited by examiner

*Primary Examiner* — Sarah B McPartlin
(74) *Attorney, Agent, or Firm* — Shumaker, Loop & Kendrick, LLP

(57) ABSTRACT

A seatback holder for a tablet computer including a bracket configured to releasably engage within a seatback pocket and a frame pivotally connected to the bracket configured to hold an installed tablet computer securely therein and pivot relative to the bracket to adjust the viewing angle of the installed tablet computer relative to a seatback.

14 Claims, 4 Drawing Sheets

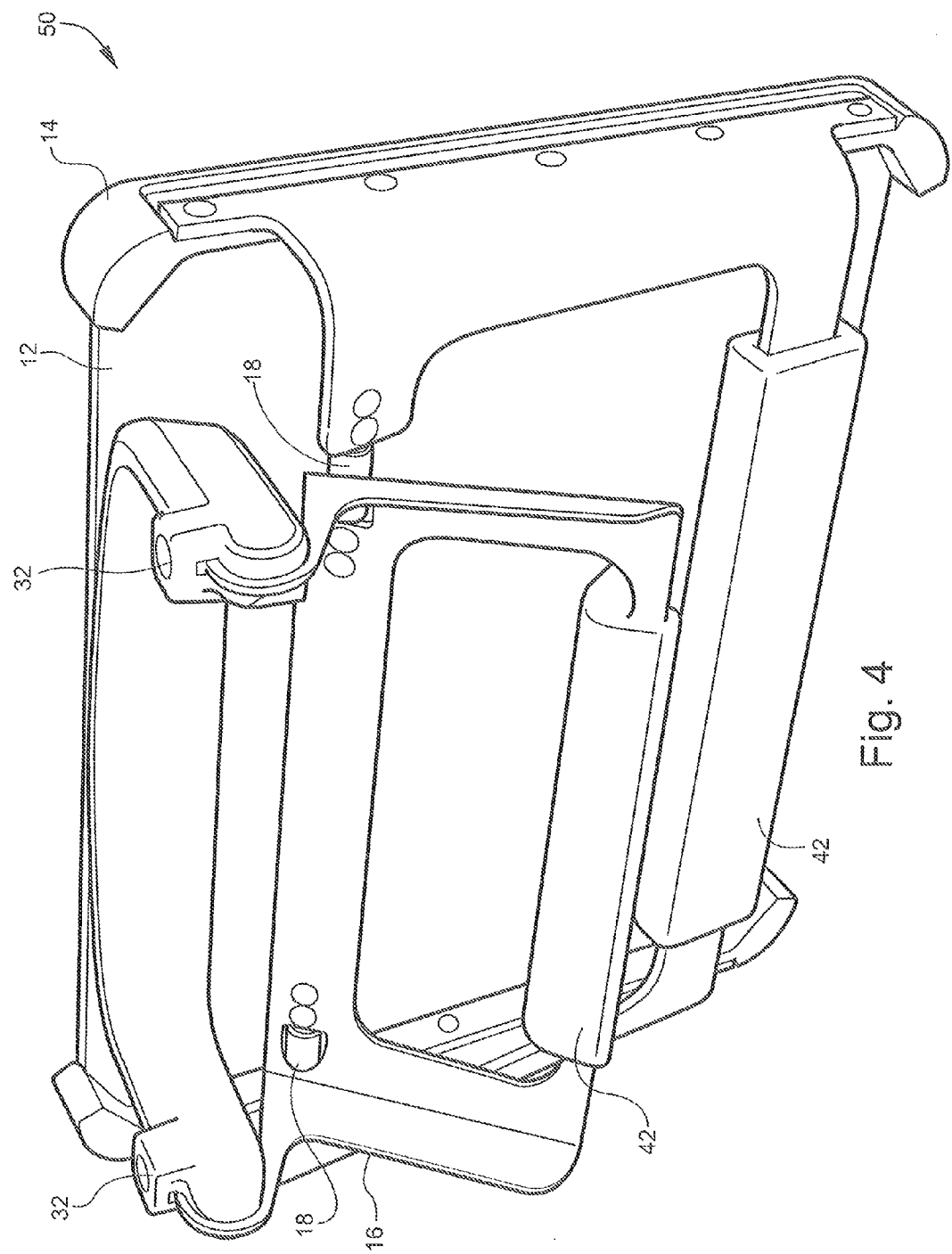

SEATBACK HOLDER FOR TABLET COMPUTERS

CROSS-REFERENCE TO RELATED APPLICATION

This application claims priority to U.S. Provisional Application No. 61/471,487 filed Apr. 4, 2011, the contents of which are incorporated by reference herein.

TECHNICAL FIELD AND BACKGROUND OF THE INVENTION

The present invention relates generally to the field of holders for electronic devices such as tablet computers, and more particularly, to a holder for tablet computers that enables their releasable attachment to a seatback such as an aircraft seatback for hands-free viewing and stowage.

Due to the high cost and complexity associated with integrated seatback monitors, and the inability to compute on such monitors or easily upgrade to newer models, carriers are turning to tablet computers because of their computing capabilities, wireless connectivity, long battery life, portability, lightweight and thin profile. Tablet computers can be used during a flight for everything from surfing the internet, to watching movies, to electronic readers, among other uses.

Unlike laptop computers in which displays are adjustably supported by their attached keyboard base, tablet computers are essentially flat displays that lack any type of integrated stand, and thus are typically required to be held during use. For use on a conveyance such as an aircraft, it would be beneficial to have a holder for tablet computers. For example, it would be useful to have a holder that releasably attached to a supporting surface such as a seatback so that a seated passenger could view the tablet without having to hold it or rig up a makeshift stand. It would also be useful if the holder allowed the angle of the tablet to be adjusted to provide the proper viewing angle and accommodate seatback recline. It would further be useful for the holder to stow the tablet when not in use and during taxi, takeoff and landing.

BRIEF SUMMARY OF THE INVENTION

Accordingly, in one aspect a holder for tablet computers is provided herein configured for holding a tablet for hands-free viewing.

In another aspect, the holder is configured to releasably attach a tablet computer to a supporting surface such as aircraft seatbacks.

In yet another aspect, the holder allows the viewing angle of its installed tablet computer to be adjusted.

In yet another aspect, the holder allows the angle of the installed tablet computer to be adjusted relative to a reclining seatback.

In yet another aspect, the holder safely stows a tablet computer within reach of a seated passenger.

In yet another aspect, the holder charges and connects the tablet computer to a communications network.

To achieve the foregoing and other aspects and advantages, in a first embodiment a holder for a tablet computer is provided herein including a bracket configured to releasably engage within a seatback pocket, and a frame pivotally connected to the bracket configured to hold an installed tablet computer securely therein and present the tablet computer for viewing and use, the frame configured to pivot relative to the bracket to adjust the viewing angle of the installed tablet computer relative to a seatback.

The bracket may include a first portion shaped to seat on a ledge of the seatback pocket and a release bar movable relative to the first portion, wherein the release bar is compressible in a direction toward the first portion such that the bracket compresses vertically when engaged within the seatback pocket and expands vertically when removed from the seatback pocket. The release bar and the first portion may together form a V-spring.

The release bar may include at least one projection extending vertically upward from a top surface thereof that engages within one or more complimentary recess in the underside of the top of the seatback pocket when the bracket is engaged within the seatback pocket to lock the bracket in the pocket. The release bar may be compressible in the direction of the first portion to clear the projection from the complimentary recess to remove the holder from the seatback pocket.

In another embodiment, a tablet computer holder assembly is provided herein including a holder including a bracket and a frame pivotally connected to the bracket, the frame configured to hold an installed tablet computer securely therein and present the tablet computer for viewing and use and pivot relative to the bracket to adjust the viewing angle of the installed tablet computer relative to a seatback, and a pocket insert for installation within a seatback pocket, the pocket insert retaining the bracket therein in a compressed state to prevent the holder from being removed therefrom.

Additional features, aspects and advantages of the invention will be set forth in the detailed description which follows, and in part will be readily apparent to those skilled in the art from that description or recognized by practicing the invention as described herein. It is to be understood that both the foregoing general description and the following detailed description present various embodiments of the invention, and are intended to provide an overview or framework for understanding the nature and character of the invention as it is claimed. The accompanying drawings are included to provide a further understanding of the invention, and are incorporated in and constitute a part of this specification.

BRIEF DESCRIPTION OF THE DRAWINGS

These and other features, aspects and advantages of the present invention are better understood when the following detailed description of the invention is read with reference to the accompanying drawings, in which:

FIG. 4 is a rear perspective view of a holder for tablet computers in accordance with a second embodiment of the invention.

DETAILED DESCRIPTION OF THE INVENTION

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention. Like reference numbers refer to like elements throughout the various drawings.

Figure 1:
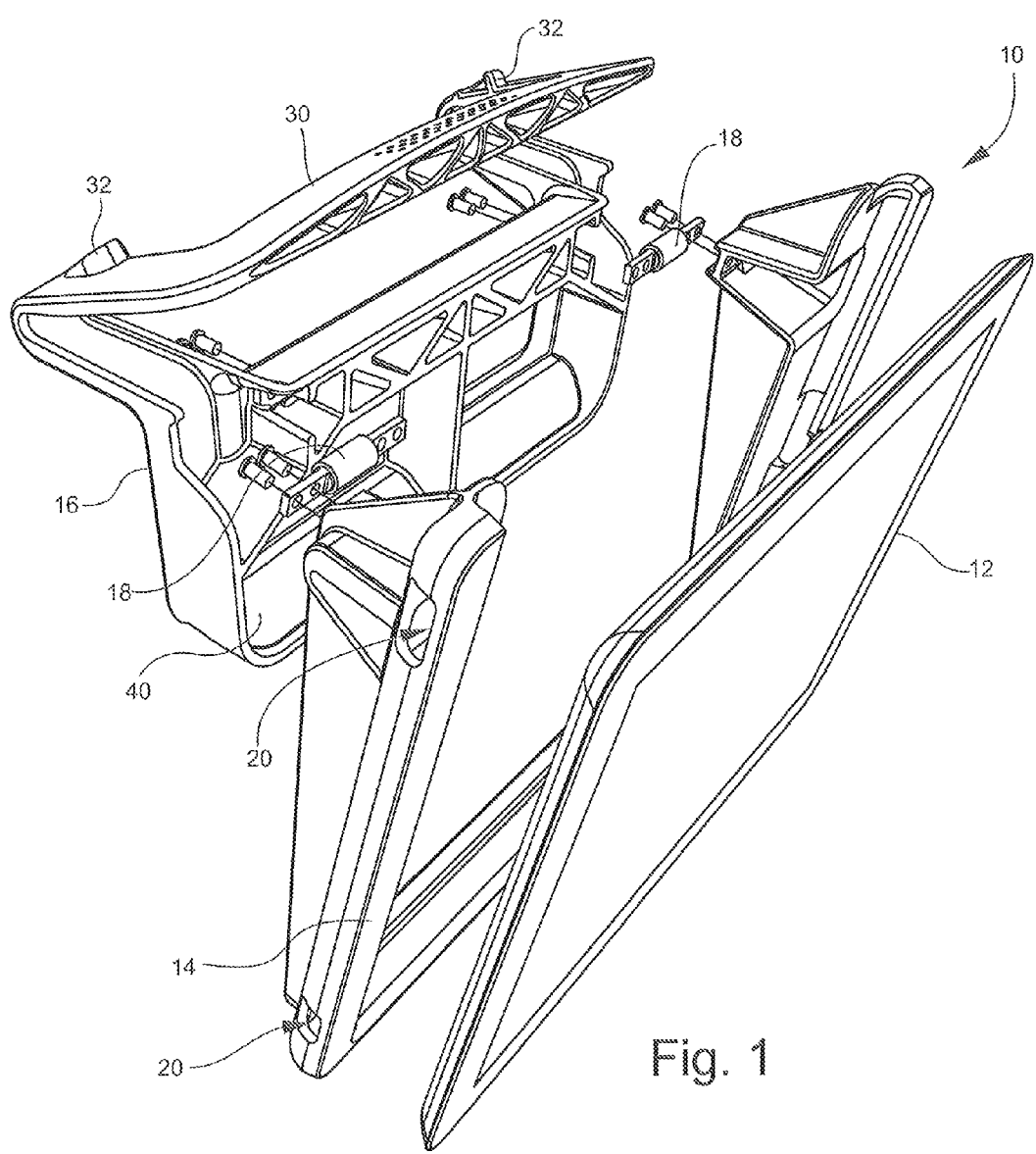
FIG. 1 is a front perspective view of a holder for tablet computers in accordance with a first embodiment of the invention.
Figure 2:
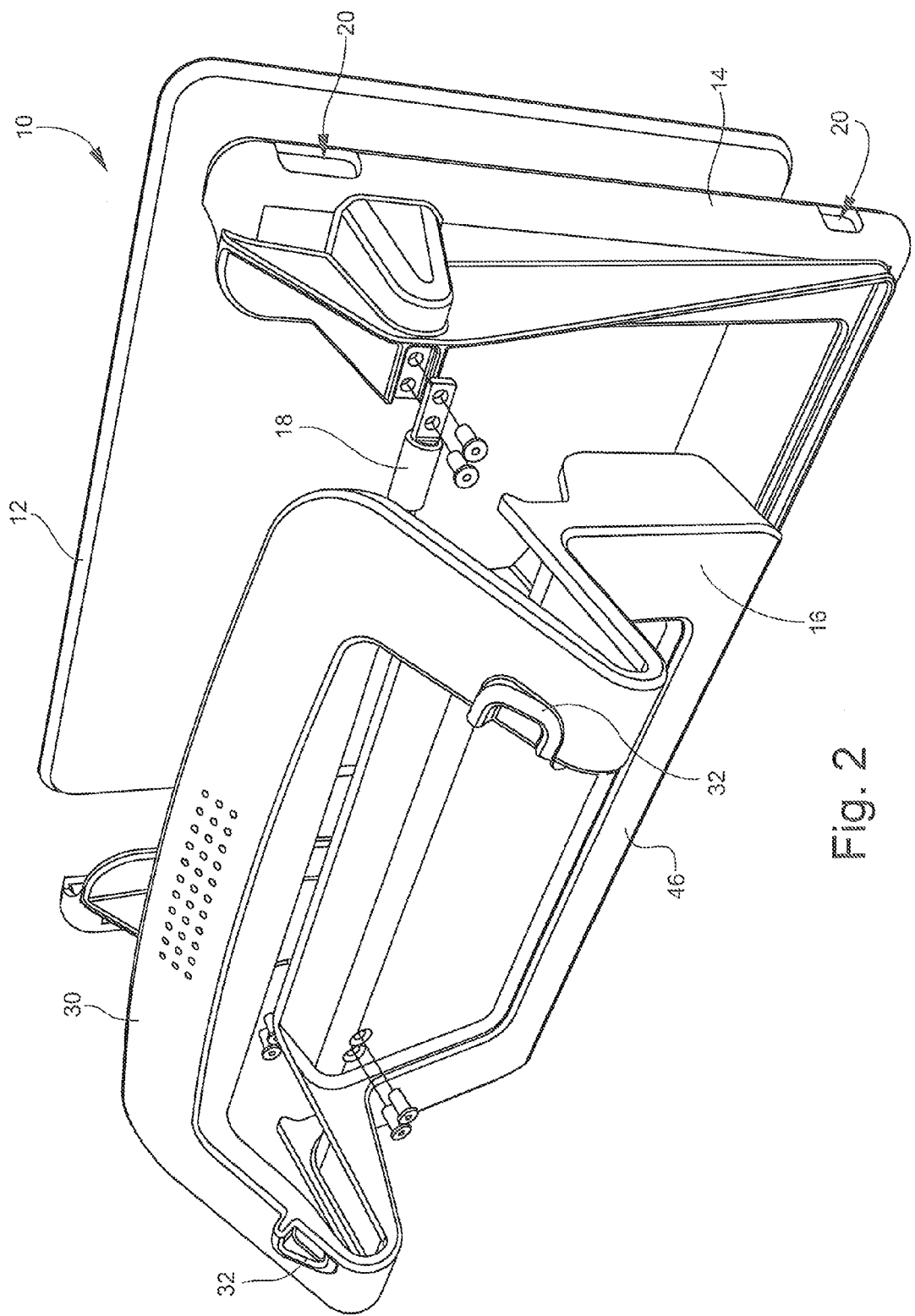
FIG. 2 is a rear perspective view of the holder of FIG. 1

Referring to FIGS. 1 and 2, a first embodiment of a holder for tablet computers is shown generally at reference numeral 10. The holder 10 is configured to securely and releasably hold any size tablet computer or monitor shown generically at reference numeral 12. Suitable examples of tablet computers include the iPad®, Kindle Nook® and Galaxy® tablet, among others. The tablet 12 is preferably held within the holder 10 such that the holder overlaps portions of the frame of the tablet but does not obstruct any of the screen or block access to tablet control buttons. The holder 10 may be configured to hold the tablet 12 such that the tablet cannot be removed without a tool or disassembling a portion of the holder, or may be configured to release the tablet without the use of tools or disassembly of the holder. For example, the tablet 12 may be slid into the holder 10 from above.

The holder 10 generally includes a frame 14 presenting the installed tablet 12 for viewing/use, and a rear bracket 16 that engages a seatback or other supporting surface to hold the tablet 12 for hands-free viewing. The frame 14 is configured for pivoting movement relative to the rear bracket 16 so that the angle of the tablet 12 can be adjusted. In applications in which the holder 10 is releasably attached to a reclining seatback, the angle of the frame 14 may be adjusted (e.g., tilted) by the seated passenger as the forward positioned seatback is reclined.

The frame 14 has a sufficient depth and clearance from the bracket 16 such that the frame is able to pivot with respect to the bracket. The frame 14 may have a pivoting range of movement of about 30 degrees, for example. As shown, the frame 14 pivots relative to the bracket 16 about pivot points, such as hinges 18. The holder 10 may be constructed from any material, but is preferably constructed from durable and lightweight materials such as aluminum and plastics, among other. Seatback engaging portions of the holder 10 may include padding 42 for tight-fit engagement with the seatback and to reduce vibration transferred to the tablet computer 12.

The frame 14 as shown is three-sided, defining an open-faced sleeve into which the tablet 12 is slid into from above. As stated above, the frame 14 may be substantially continuous around the perimeter of the tablet 12 to prevent withdrawal of the tablet from the frame from the sides, above or below, or may cover less than substantially the entirety of the perimeter of the tablet such that the tablet can be withdrawn from one direction. For example, the frame 14 may cover portions of the corners and/or sides of the tablet 12. As shown in FIG. 1, openings 20 may be provided along the sides of the frame 14 to leave buttons, controls, plugs, ports, etc. of the tablet 12 uncovered for access thereto.

In an exemplary embodiment, the frame 14 may include front and back halves that separate to load the tablet 12 in the frame and secure together to lock the tablet within the frame. Other portions of the frame 14 may be removable to install the tablet 12 within the frame. The frame 14 is preferably customized to the size of the tablet being held for security purposes and to prevent movement between the tablet and the frame.

Figure 3:
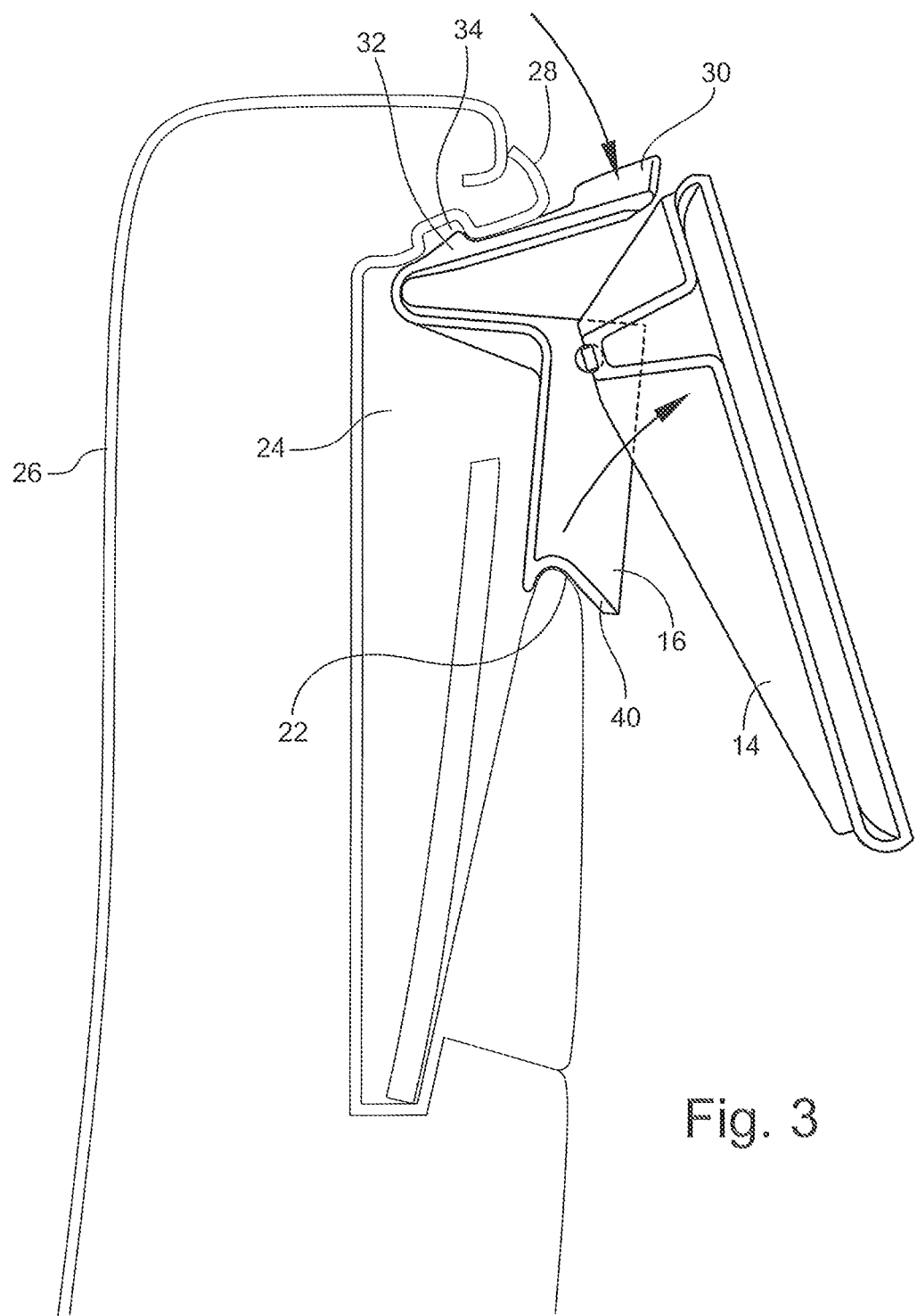
FIG. 3 is a side elevation view through the seatback showing the holder of FIG. 1 releasably attached to the seatback.

Referring to FIGS. 2 and 3, to releaseably attach/mount the holder 10 to a seatback, a first portion 40 of the rear bracket 16 seats upon a ledge 22 of a pocket 24 defined in a seatback 26. The seatback 26 may include a pocket insert 28 having a shape configured to releasably engage the bracket 16 to hold the bracket firmly in place on the seatback and release the bracket 16 through actuation of the bracket. As shown, the bracket includes a release bar 30 for releasing the holder 10 from the seatback. The bracket 16 seats upon the ledge 22 and partially within the pocket 24 to prevent the holder 10 from being withdrawn in the aft direction relative to the seatback when installed and "locked". The release bar 30 defines projections 32 that are received within recesses 34 in the top of the pocket 24 or pocket insert 28 when properly installed.

In the properly installed position, the bracket 16 seats on the ledge 22 and the release bar 30 is compressed downward. The release bar 30 and other portion of the bracket 16 together form a V-spring compressible in the vertical direction such that the compressed release bar is biased upward in the direction of the top of the pocket 24 or inset 28. The cooperation of the engagement of the bracket 16 with the ledge 22, the engagement of the projections 32 within their recesses 34, and the spring force holds the bracket 16 within the pocket 24 or insert 28. To release the holder 10 from the pocket 24, the release bar 30 is pressed downward in the direction of the floor to clear the projections 32 from their respective recesses 34. Installation is achieved by seating the bracket 16 properly on the ledge 22 and moving release bar 30 in the direction of the seatback 26 until the projections 32 engage in their respective recesses 34 and the holder 10 "locks" in place. The projections 32 and recesses 34 (or slots) may have complimentary shapes to prevent movement therebetween and unintentional removal of the holder 10 from the seatback 26.

The bracket 16 may be modified easily by one skilled in the art so that the holder 10 can be secured to other structures.

Referring to FIG. 4, a second embodiment of a holder for a tablet computer is shown generally at reference numeral 50. In the second embodiment, the release bar 30 pivots with respect to the portion of the bracket 16 that seats on the ledge 22. To actuate release from the seatback, the release bar 30 is pushed downward towards the floor to clear the projections 32 from complimentary slots or recesses. As in the first embodiment, the frame 14 is pivotally attached to the bracket 16 such that the bracket is fixed in relation to the supporting surface (e.g., the seatback), but the frame is able to pivot relative to the seatback to adjust the viewing angle of the installed tablet computer.

In a further embodiment, the bracket that releasably locks the holders to the seatback may additionally connect to power in the seatback to power/charge the tablet computer. A power cord may be routed inside the bracket 16. The bracket 16 may also pivot with respect to the frame 14 to support the tablet computer 12 in a free standing position. Thus, the bracket also functions as a stand.

The foregoing description provides embodiments of the invention by way of example only. It is envisioned that other embodiments may perform similar functions and/or achieve similar results. Any and all such equivalent embodiments and examples are within the spirit and scope of the present invention and are intended to be covered by the appended claims.

What is claimed is:

1. A seatback holder for tablet computers, comprising:

a bracket configured to releasably engage within a seatback pocket, the bracket configured to engage a ledge and a top of the seatback pocket and compress to urge against the ledge and the top of the seatback pocket to retain the seatback holder in the seatback pocket, the bracket having a first portion shaped to seat on the ledge and a release bar compressible in a direction toward the first portion such that the bracket compresses vertically when engaged within the seatback pocket and expands vertically when removed from the seatback pocket; and a frame pivotably connected to the bracket configured to hold an installed tablet computer securely therein and present the tablet computer for viewing and use, the frame configured to pivot relative to the bracket to adjust the viewing angle of the installed tablet computer relative to a seatback.

2. The seatback holder according to claim 1, wherein the release bar and the first portion together form a V-spring.

3. The seatback holder according to claim 1, wherein the release bar is pivotally attached to the first portion.

4. The seatback holder according to claim 1, wherein the first portion is padded.

5. The seatback holder according to claim 1, wherein the frame is an open-faced sleeve into which the tablet computer is slid into from vertically above.

6. The seatback holder according to claim 1, wherein the frame covers portions of a frame of the tablet computer.

7. The seatback holder according to claim 1, wherein the frame defines one or more openings therethrough aligned with underlying buttons or ports of the tablet computer.

8. A tablet computer holder assembly, comprising:
a holder including a bracket and a frame pivotally connected to the bracket, the frame configured to hold an installed tablet computer securely therein and present the tablet computer for viewing and use and pivot relative to the bracket to adjust the viewing angle of the installed tablet computer relative to a seatback; and
a pocket insert for installation within a seatback pocket, the pocket insert retaining the bracket therein in a compressed state to prevent the holder from being removed therefrom;
the bracket having a first portion shaped to seat on a ledge of the pocket insert and a release bar compressible in a direction toward the first portion such that the bracket compresses vertically when engaged within the pocket insert and expands vertically when removed from the pocket insert.

9. The tablet computer holder assembly according to claim 8, wherein the release bar defines a projection extending vertically upward therefrom and the pocket insert defines a complimentary recess in the underside of the top surface thereof within which the projection engages when the bracket is attached to the pocket insert.

10. The tablet computer holder assembly according to claim 9, wherein the release bar is compressible in the direction of the first portion to clear the projection from the complimentary recess to remove the holder from the pocket insert.

11. The tablet computer holder assembly according to claim 8, wherein the release bar is pivotally attached to the first portion.

12. The tablet computer holder assembly according to claim 8, wherein the first portion is padded.

13. The tablet computer holder assembly according to claim 8, wherein the frame is an open-faced sleeve into which the tablet computer is slid into from vertically above.

14. The tablet computer holder assembly according to claim 8, wherein the frame defines one or more openings therethrough aligned with underlying buttons or ports of the tablet computer.

* * * * *